June 18, 1929.   O. A. QUARNSTROM   1,718,072
PIPE OR ROD CLAMP
Filed Oct. 6, 1927   2 Sheets-Sheet 1
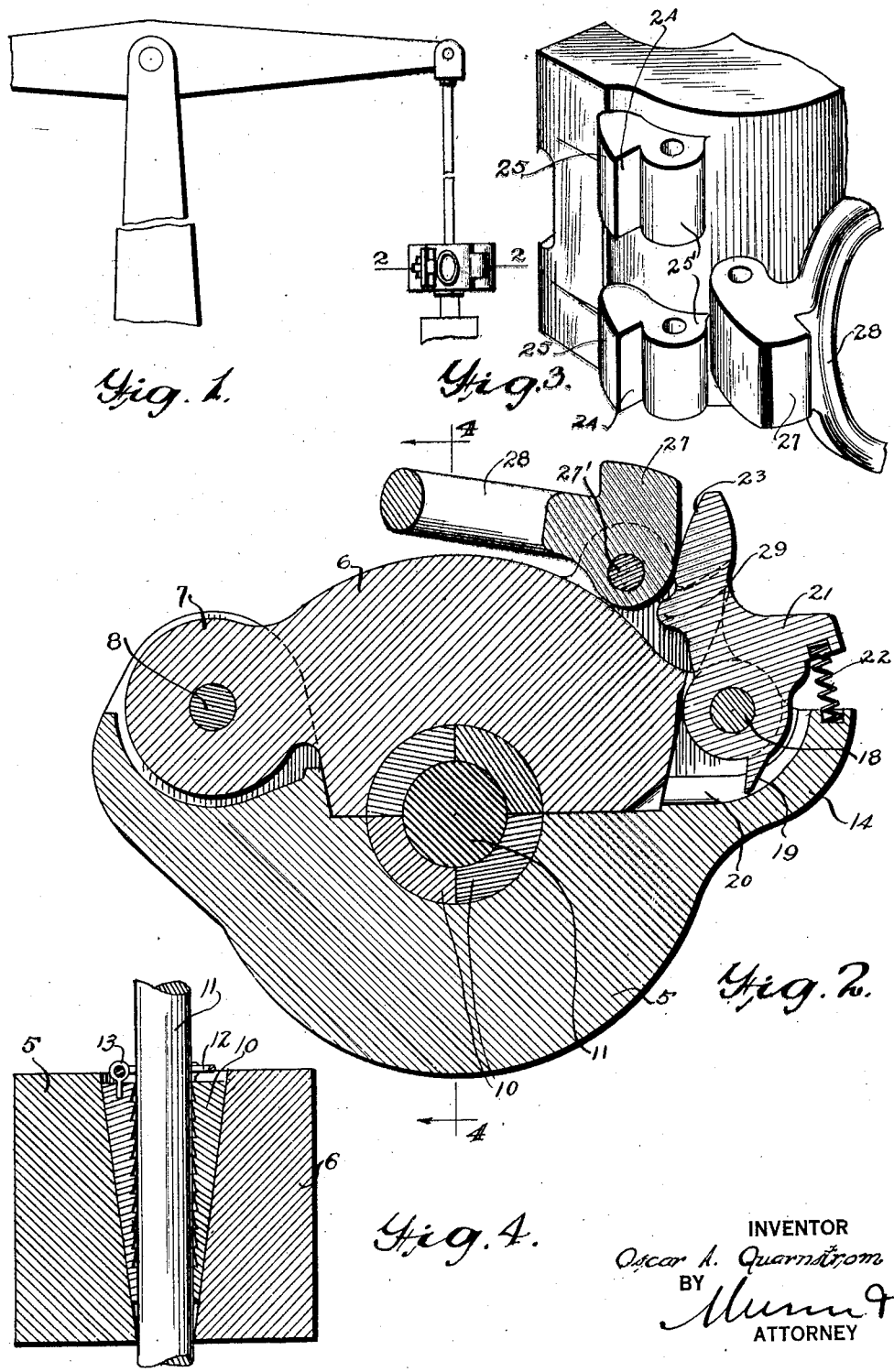
INVENTOR
Oscar A. Quarnstrom
BY
Munn &Co,
ATTORNEY June 18, 1929.                O. A. QUARNSTROM                1,718,072
                               PIPE OR ROD CLAMP
                              Filed Oct. 6, 1927          2 Sheets-Sheet 2
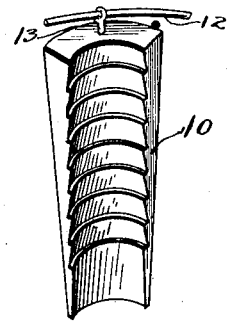
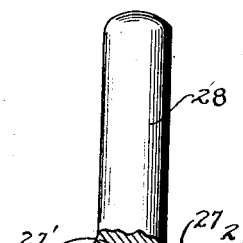
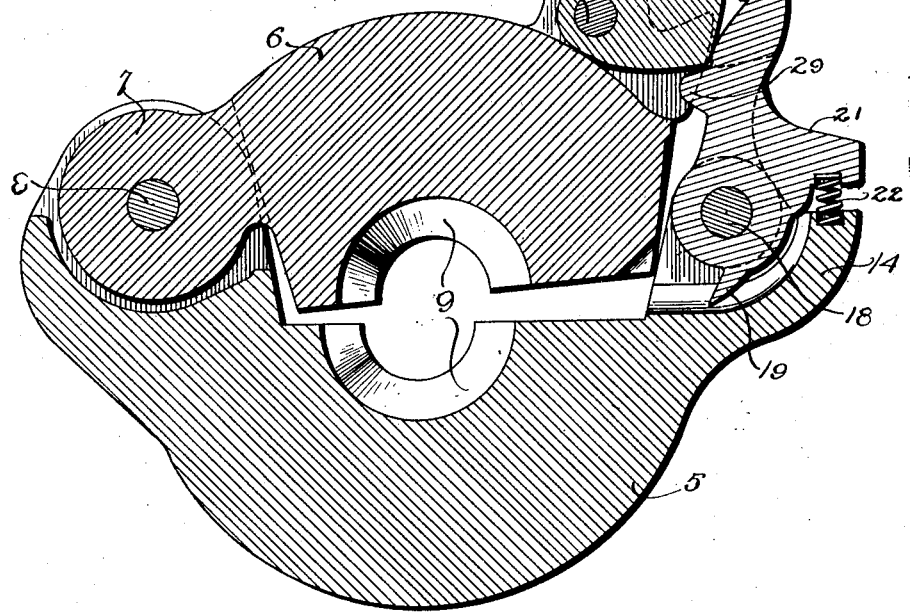
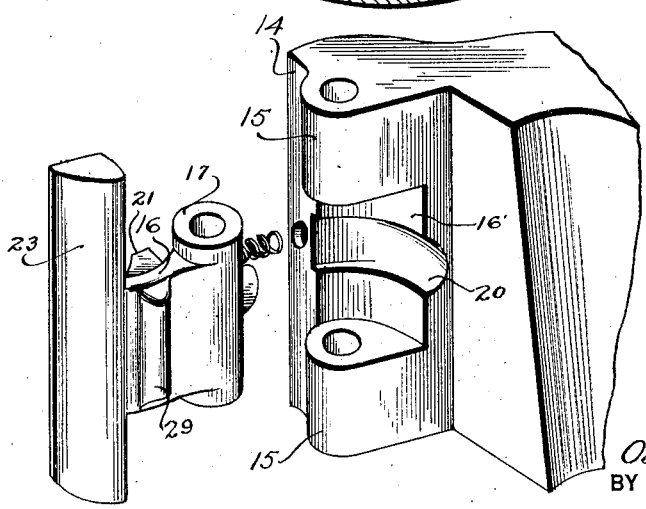
INVENTOR
Oscar A. Quarnstrom
BY
ATTORNEY Patented June 18, 1929.

1,718,072

UNITED STATES PATENT OFFICE.

OSCAR A. QUARNSTROM, OF HOMINY, OKLAHOMA.

PIPE OR ROD CLAMP.

Application filed October 6, 1927. Serial No. 224,437.

This invention relates to pipe or rod clamps and more particularly to oil well rig polish rod clamps.

An object of the invention resides in the provision of a clamp of this type which may quickly be applied or removed from the polish rod or other similarly shaped object and when applied will positively grip the rod to support the latter.

Further the invention provides a latch for latching the clamp sections or jaws together about the object arranged therebetween.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a fragmentary elevation of a well rig with my invention associated therewith;

Figure 2 is a horizontal sectional view on an enlarged scale and taken on line 2—2 of Figure 1;

Figure 3 is a fragmentary perspective of the clamp;

Figure 4 is a vertical sectional view of the device engaged with a polish rod;

Figure 5 is a horizontal sectional view of the device in open position;

Figure 6 is a fragmentary perspective of one of the clamping jaws and associated latch element; and Figure 7 is a perspective of one of the slips used in conjunction with the invention.

Referring to the invention in detail a pair of substantially semi-circular complementary clamp sections or jaws 5 and 6 formed with hinged knuckles 7 at one end receiving a hinge pin 8 is provided, the opposed faces of the jaws having semi-circular tapered jaw faces or grooves 9 which when in operative position receive wedge slips 10 to bindingly engage the polish rod 11. As shown in Figures 4 and 7 these wedge slips are connected together by means of a ring 12 passing through eyes 13 attached to upper ends 7' of these slips. At its free end the paw 11 is formed with a lateral enlargement 14 formed with parallel ears 15 and a semi-circular recess 16' between these ears.

A substantially T-shaped latch element 16 having a sleeve or knuckle 17 at one end positioned in the recess 16' and receiving a hinge pin 18 passing through the ears 15 is provided.

A stop 19 projecting from the sleeve or knuckle 17 movable in a groove 20 formed in the lateral enlargement and intersecting the recess 16' is provided and is adapted to engage the enlargement to limit the movement of the latch element in one direction. That is, where it will normally be in a position at right angles to the transverse axis of the device. A tail 21 is formed on the latch element in opposed relation to the lateral enlargement and an expansible spring 22 is interposed between this enlargement and the tail to normally urge the latch element forwardly.

The latch element is provided with a cam head 23 which is adapted to engage behind inclined surfaces 24 of a pair of vertically alined keeper lugs 25 cast with the outer faces of the free end of the jaw 6.

Vertically alined knuckles 25' are formed with the outer face of the jaw 6 at the rear of the lugs 25 and disposed between those knuckles is a latch head disengaging cam 27, the latter being pivotally supported by means of a hinge pin 27' passing through the cam and knuckles.

A loop or handle 28 formed integral with the cam projects at right angles thereto and is normally disposed parallel to the jaws so that upon movement of the handle in a forward direction the cam engaging the cam surface of the latch element disengages the latter from the keeper lugs. It will be seen that after the latch element has been disengaged the jaw 6 may be swung away from the jaw 5 by exerting full manual pressure upon the handle.

A lateral rounded enlargement 29 is formed upon the inner face of the latch element intermediate its ends, which is adapted to engage the cam 27 and throw the same from the position illustrated in Figure 5 to the position illustrated in Figure 2 upon moving the clamping jaws into clamping position.

What is claimed is:

1. In a clamp, a pair of pivotally connected complementary clamping jaws, a latch element pivotally attached to the free end of one of the jaws and normally extending at right angles thereto, a keeper carried by the free end of the other jaw and normally engaged by the latch element, a handle member pivoted to the last-mentioned jaw and normally substantially parallel to the jaws and operable to disengage the latch element from the keeper upon movement of the handle member to a position at right angles to the jaws, and cooperating means on the handle member and latch element whereby to return the handle member to normal position incident to movement of the jaws to clamping position.

2. In a clamp, a pair of pivotally connected complementary clamping jaws, a latch element pivotally attached to one of the jaws, a keeper carried by the other jaw and normally engaged by the latch element, a handle member pivotally attached to the other jaw and normally substantially parallel to the jaws and operable to disengage the latch element from the keeper upon movement of the handle to a position at right angles to the jaw, and a lateral enlargement on the latch element and engageable with the handle member to return it to normal position upon movement of the jaws towards each other.

3. In a clamp, a pair of coacting clamping members pivotally connected together, a pair of spaced laterally extending lugs carried by the outer face of one clamping member adjacent its free end, a substantially T-shaped latch element pivoted to the free end of the other jaw and normally interlocked with the lugs, a cam head pivotally attached to the first mentioned clamping member and movable between the lugs and engageable with the latch to disengage the same therefrom, and a handle carried by the cam head and normally disposed substantially parallel to the clamping members, the handle member being operable to a position at right angles to the jaws to disengage the latch element, and the latch element being engageable with the cam head to swing it to a position to dispose the handle in normal position upon movement of the clamping members towards each other.

4. In a clamp, a pair of pivotally connected complementary clamping jaws, a spring urged latch element pivoted to the free end of one of the jaws, a keeper carried by the free end of the other jaw and normally engaged by the latch element, a handle member pivotally supported on the last-mentioned jaw adjacent the keeper and normally lying parallel to such jaw, and cooperating cam means between the handle and latch element whereby to disengage the latch element from the keeper upon swinging the handle in one direction, such cam means being operable to swing the handle in the opposite direction upon movement of the jaws to clamping position.

Signed at Hominy, in the county of Osage and State of Oklahoma, this 1st day of October, 1927.

OSCAR A. QUARNSTROM.